US007386927B2

(12) United States Patent
Maxwell et al.

(10) Patent No.: US 7,386,927 B2
(45) Date of Patent: Jun. 17, 2008

(54) APPARATUS TO ROLL, CUT, WELD, AND FORM TANK CAR OUTER JACKETS

(75) Inventors: Perry M. Maxwell, Longview, TX (US); James A. Minton, Jr., Longview, TX (US)

(73) Assignee: Trinity Industries, Inc., Dallas, TX (US)

( * ) Notice: Subject to any disclaimer, the term of this patent is extended or adjusted under 35 U.S.C. 154(b) by 470 days.

(21) Appl. No.: 11/180,825

(22) Filed: Jul. 12, 2005

(65) Prior Publication Data

US 2007/0011858 A1    Jan. 18, 2007

(51) Int. Cl.
*B21D 39/03* (2006.01)
*B23P 11/00* (2006.01)

(52) U.S. Cl. .............. 29/431; 29/431; 29/463; 29/429; 242/520; 242/524; 228/17; 228/17.7; 228/144; 219/61; 219/60 R; 219/158; 219/59.1

(58) Field of Classification Search ............... 242/520, 242/524; 29/430; 228/17, 17.7, 144; 156/189, 156/190, 170–174; 219/61, 60 R, 158, 59.1
See application file for complete search history.

(56) References Cited

U.S. PATENT DOCUMENTS

| 3,178,550 | A | * | 4/1965 | Eggert, Jr. | ............... | 219/62 |
| 3,345,233 | A | * | 10/1967 | Wilkins | ............... | 156/189 |
| 5,180,095 | A | * | 1/1993 | Orth | ............... | 228/17.7 |
| 5,997,232 | A | * | 12/1999 | Sauer | ............... | 413/1 |

\* cited by examiner

*Primary Examiner*—Sam Chuan Yao
*Assistant Examiner*—Erin P Barry
(74) *Attorney, Agent, or Firm*—Baker Botts L.L.P.

(57) ABSTRACT

A system and method of fabricating tank car outer jackets are provided that include supporting a plurality of coils of sheet metal on a plurality of coil supports such that the central longitudinal axes of the plurality of coils are generally parallel to a central longitudinal axis of a mandrel adjacent the plurality of coils. A plurality of sheets of sheet metal are unwound from the plurality of coils by rotating each of the plurality of coils generally about the respective central longitudinal axes of each of the plurality of coils. As the plurality of sheets of sheet metal are wound onto the mandrel, adjacent sheets of the plurality of sheets of sheet metal are welded together using a plurality of automated welding torches proximate the mandrel. The plurality of automated welding torches may be coupled for communication with a programmable logic controller.

17 Claims, 10 Drawing Sheets

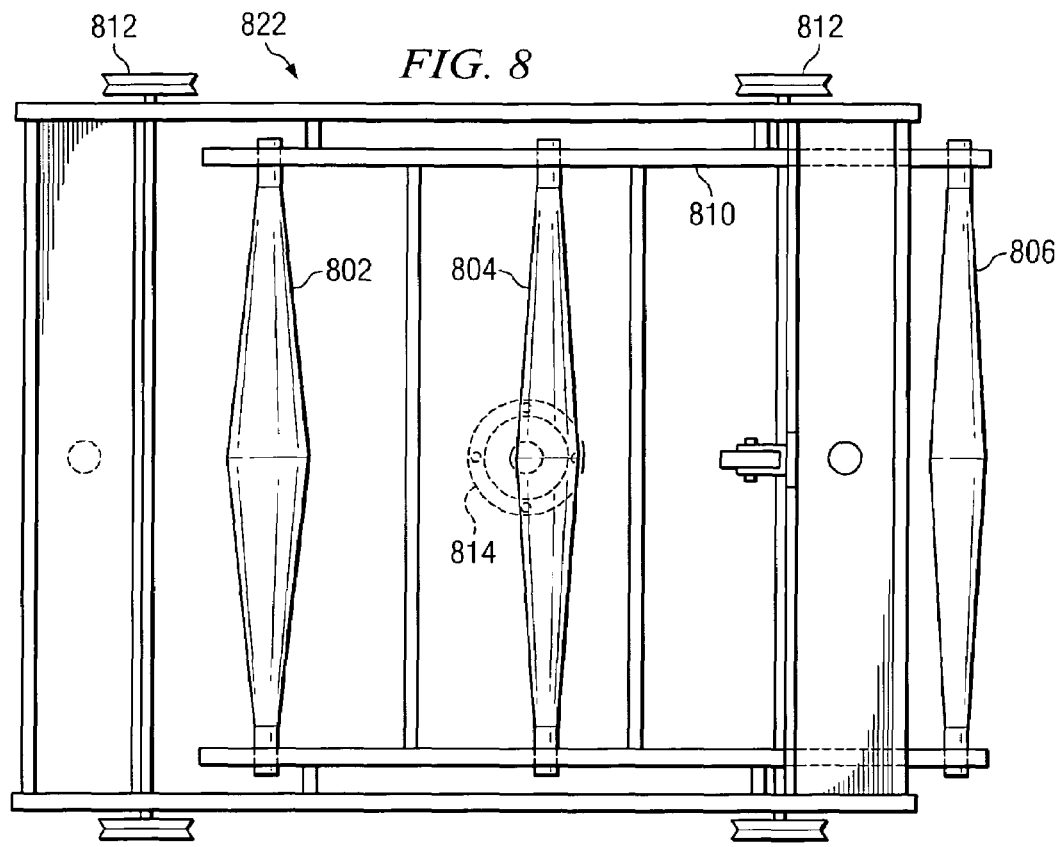
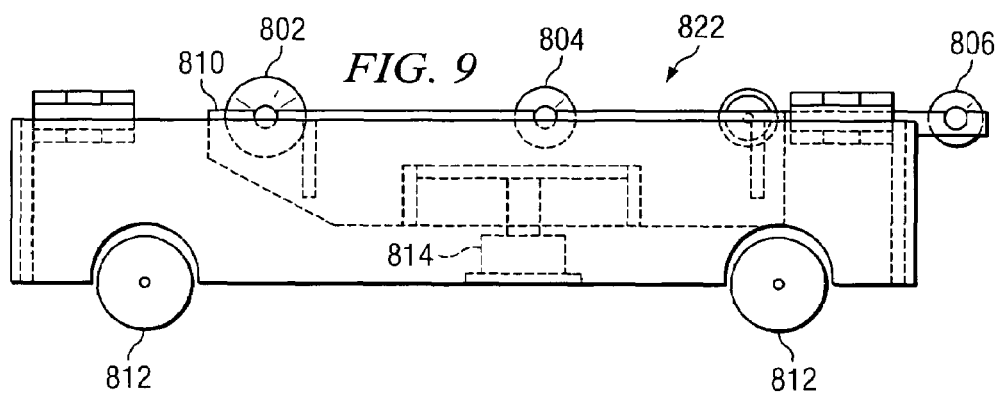

APPARATUS TO ROLL, CUT, WELD, AND FORM TANK CAR OUTER JACKETS

TECHNICAL FIELD OF THE INVENTION

This invention relates in general to railcar manufacturing, and more particularly to an apparatus to roll, cut, weld, and form tank car outer jackets.

BACKGROUND OF THE INVENTION

Insulated tank cars often include an outer jacket wrapped around an inner hull or shell. An insulating material may be placed between the hull and the outer jacket. The outer jacket serves to protect and contain the insulating material.

Previously, insulated tank car outer jacket fabrication may have included applying strips of steel or other pre-fabricated material directly onto tank car jacket supports or spacers. Each strip may be laid out and carefully placed in order to have symmetrical seams. Following the layout, the seams may be welded and nozzle and bolster openings cut. Care must be exercised during cutting to avoid damaging the insulation applied between the tank shell and outer jacket. Handling may also be critical as lofting and rigging apparatus may crease the outer jacket. Care must also be taken to avoid collapsing or bending the jacket.

Alternatively, insulated tank car outer jacket fabrication may include laying material on a flat surface (such as a floor), arranging the materials according to the required dimensions, welding together some or all of the sections, and then installing the outer jacket on the car shell. Layouts for the nozzles, man ways, and bolsters may be manually applied prior to cutting. After cutting, the sections or completed assemblies may be rigged and lofted into position on the tank shell. This form of jacket fabrication may require enormous floor space and skilled layout personnel. Match lines may also need to be created and aligned so that cutouts match and/or properly align. Layout and fitting may be time consuming and may pose considerable quality control obstacles.

A further alternative insulated tank car outer jacket fabrication method may include the application of Spiral Welding to form a continuous tube. Flat coil material may be fed through a series of rollers that may spiral the strip into a tube. The interfaces of the spiral may be welded as the tube is formed. As the tube progresses, it may be cut to length and moved to an area where additional layout and cutting may be performed. At a separate station, the tube may be cut longitudinally so that it can be installed over the tank. Layouts and cuts for the nozzles, man ways, and bolsters are also made.

Another method of jacket fabrication may include decoiling several widths of coil stock onto a large diameter mandrel of a jacket jig. The jig may closely match the length and diameter of the tank to which the jacket will be applied. The coil stocks may be wound to a measured length and then oxy-fuel torch cut. This leaves a strip of coil (or sheet of sheet metal) attached to the jig. A second set of coil stock may be wound to the jig after indexing the jig approximately a distance equal to the width of coil. The second set of coil stock may overlap the first set of coil stock by approximately 1" at the intersections. Tack welds may be applied to the overlap, or lap joints, as the jig is rolled. After tack welding, two to four operators may weld the seam to completion to form the assembly (jacket). Following welding, the jacket may be manually laid out with chalk lines indicating where the cutouts are to be made by oxy-fuel torches at the required locations for nozzles, man ways, bottom outlets, and bolsters. At the completion of cutting, the jacket may be removed from the jig and prepared for installation over the tank car shell.

Prior systems for jacket fabrication have used coil alignment sensors and movable coil support carriages to keep sheets of sheet metal from spiraling onto the mandrel. In instances where it is desirable for the sheets of sheet metal to be wound onto the mandrel without spiraling, alignment sensors may be placed in close proximity to the mandrel. The alignment sensors may be in the form of disks capable of sensing a sheet of sheet metal has become misaligned. The sensors may be coupled for communication with an actuator on the coil support carriage. The actuator may be operable to move the coil support carriage, and thereby the coil, along a track running parallel to the mandrel. The coil support carriage may be moved until the alignment of the sheet of sheet metal being wound onto the mandrel has been corrected. Correct alignment may be determined by the coil alignment sensor, which may indicate to the actuator that the alignment no longer needs adjustment.

Fabricating flat sided jackets usually includes laying out and cutting the area for the flat side from a round jacket. A flat plate may then be welded in place of the cut out section to form a flat on the side of the jacket. The welding and cutting may cause distortion of the sheet metal, leaving waves and creases along the welded surfaces.

Alternatively, a flat side may be formed by passing a width of material through a brake press to crease transverse sections the width of the flat along the length of the coil. The strips may then be wound on a mandrel. As the winding proceeds, the creases transverse of the coil will remain relatively flat. Further work on the flat may be needed to obtain a smooth surface.

SUMMARY OF THE INVENTION

In accordance with the present invention, the disadvantages and problems associated with fabrication of outer jackets for insulated tank cars have been substantially reduced or eliminated. In particular, a system and method are provided to stream line and automate the steps of de-coiling, measuring, rolling, cutting, and welding of tank car jackets and the forming of flat sided jackets.

In accordance with one embodiment of the present invention, a method of fabricating tank car outer jackets includes supporting a plurality of coils of sheet metal on a plurality of coil supports such that the central longitudinal axes of the plurality of coils are generally parallel to a central longitudinal axis of a mandrel adjacent the plurality of coils. A plurality of sheets of sheet metal are unwound from the plurality of coils by rotating each of the plurality of coils generally about the respective central longitudinal axes of each of the plurality of coils. The plurality of sheets of sheet metal are wound onto the mandrel. As the plurality of sheets of sheet metal are wound onto the mandrel, adjacent sheets of the plurality of sheets of sheet metal are welded together using a plurality of automated welding torches proximate the mandrel. The plurality of automated welding torches may be coupled for communication with a programmable logic controller.

Particular embodiments may also include all of the plurality of sheets of sheet metal being wound onto the mandrel at the same time. Additionally, portions may be cut from the plurality of sheets of sheet metal using a plurality of automated cutting torches as the plurality of sheets of sheet metal are wound onto the mandrel. The plurality of automated cutting torches may also be coupled for communication with the programmable logic controller.

In accordance with another embodiment of the present invention, a method of fabricating tank car outer jackets includes coupling a plurality of sheets of sheet metal to an elongate tubular mandrel. Each of the plurality of sheets of sheet metal may be adjacent and touching at least one other of the plurality of sheets of sheet metal such that the plurality of sheets of sheet metal form a continuous width of sheet metal. The mandrel is rotated approximately one revolution about a central longitudinal axis of the mandrel, and each of the plurality of sheets of sheet metal is welded together with adjacent sheets of the plurality of sheets of sheet metal using a plurality of welding torches. The rotating and welding occur at the same time such that a welded length of the continuous width of sheet metal corresponding to a circumference of the mandrel results.

In particular embodiments, portions may be cut from the plurality of sheets of sheet metal using a plurality of cutting torches, and the cutting may occur at the same time as the rotating and welding such that a welded and cut tank car outer jacket results. The rotating, welding, and cutting may be controlled by a programmable logic controller, which is coupled for communication with the mandrel, the plurality of welding torches, and the plurality of cutting torches.

In accordance with another embodiment of the present invention, a system for fabricating tank car outer jackets may include an elongate tubular mandrel and a plurality of coil supports adjacent the mandrel and supporting a plurality of coils of sheet metal. Each of the plurality of coil supports may support one of the plurality of coils such that a central longitudinal axis of the one of the plurality of coils is generally parallel to a central longitudinal axis of the mandrel. Each coil support may also have at least one roller under the respective one of the plurality of coils such that each one of the plurality of coils rotate generally about the central longitudinal axis of the one of the plurality of coils as a plurality of sheets of sheet metal are unwound from the plurality of coils and wound onto the mandrel. The system also includes a plurality of automated welding torches proximate the mandrel and coupled for communication with a programmable logic controller. The plurality of automated welding torches may be operable to weld together adjacent sheets of the plurality of sheets of sheet metal as the plurality of sheets of sheet metal are wound onto the mandrel.

Particular embodiments may include a plurality of automated cutting torches proximate the mandrel and coupled for communication with the programmable logic controller. The plurality of coil supports may include a first group of coil supports and a second group of coil supports. The first and second groups of coil supports may be alternatingly arranged along a length of the mandrel. The first group of coil supports may be elevated with respect to the second group of coil supports, and the ends of the sheets of sheet metal being unwound from the coils supported by the second group of coil supports may overlap the adjacent ones of the sheets of sheet metal being unwound from the coils supported by the first group of coil supports.

Technical advantages of certain embodiments of the present invention may include automatically cutting the de-coiled sheet as the sheet is being spooled onto the jig. Plasma torches may be attached to a coordinated drive system that has been programmed to make the cut as the jig is rotating. This cutting system may be coupled to the axis drives of the torch and spindle drive of the jig. The spindle motor and torch drives may have corresponding speeds to facilitate cutting. Using the coordinated drive system may eliminate the need for measuring and laying out each tank car outer jacket. Using plasma torches may provide superior cut quality such that grinding of the cuts may be eliminated. Additionally, a multi-axis robot may be incorporated into the system to further automate the system and reduce human injury and human error.

Other technical advantages of certain embodiments of the present invention may include reduced cycle time and the flexibility to run mixed jacket at any time during production. Benefits arise from being able to de-coil and weld the jacket material without tack welding or manually measuring and laying out the jacket for cutting. Handling may be reduced, accuracy may be increased, grinding may be eliminated, and quality may be improved. Further, in certain embodiments, flat sides may be applied to the jacket without additional relocation, cutting, or welding. From the workforce standpoint, the lofting and rigging required to fabricate a jacket can be eliminated or reduced, thus providing a safer working environment.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 8 illustrates a top view of a particular embodiment of an apparatus to form a flat side on a tank car outer jacket that resides on a mandrel, in accordance with the teachings of the present invention;

FIG. 9 illustrates a side view of the apparatus to form a flat side on a tank car outer jacket illustrated in FIG. 8, in accordance with the teachings of the present invention;

DETAILED DESCRIPTION OF THE INVENTION

Figure 1:
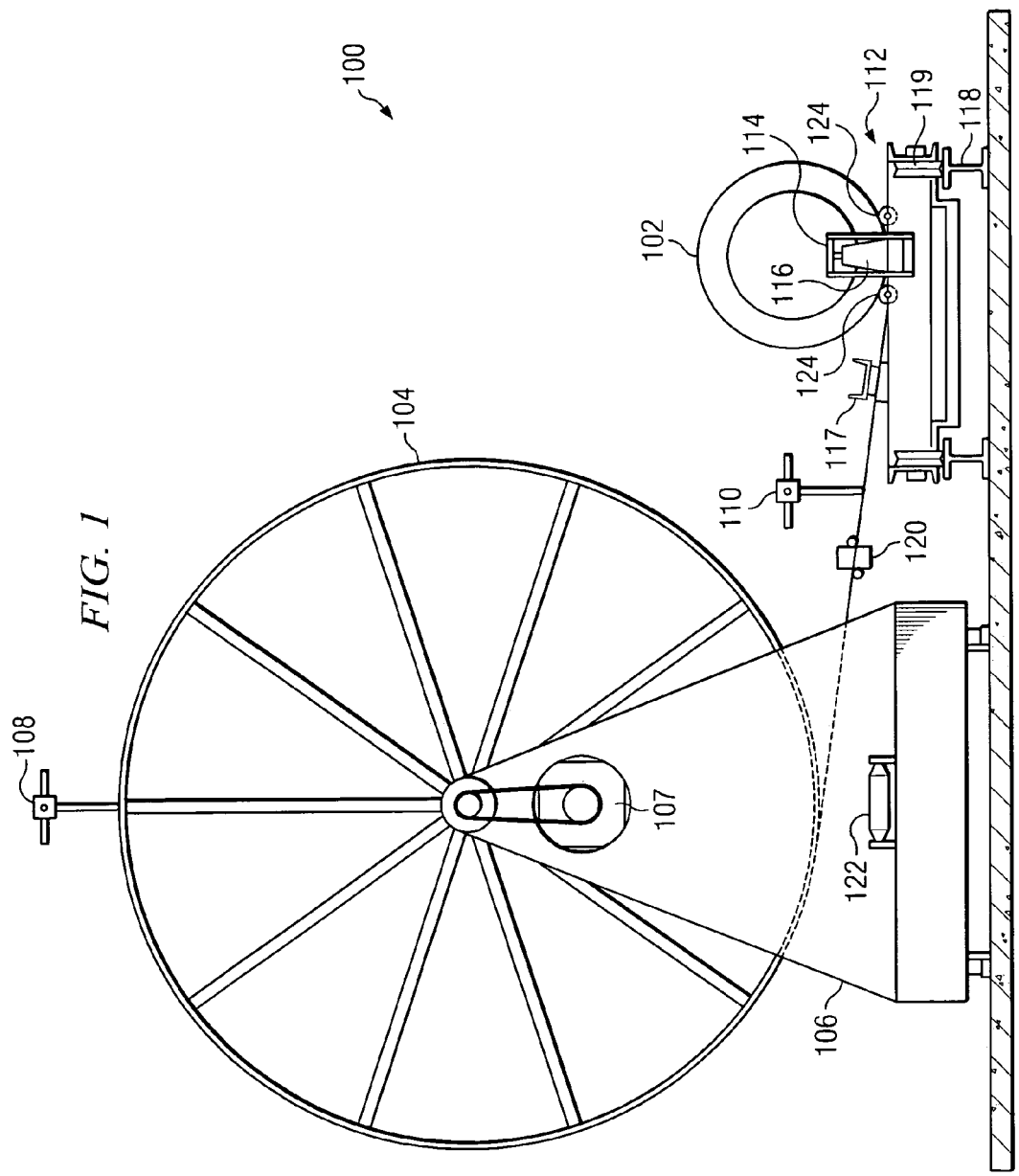
FIG. 1 illustrates a side view of one embodiment of an apparatus to roll, cut, weld, and form tank car outer jackets by cutting cutouts from sheets of sheet metal before winding the sheets onto a mandrel in accordance with the teachings of the present invention.

FIG. 1 illustrates a side view of an apparatus to roll, cut, weld and form insulated tank car outer jackets. System 100 may be used to assemble a tank car outer jacket by coupling together a plurality of sheets of sheet metal ("sheets"). The seams between adjacent sheets may be welded, and cutouts may be removed from the sheets. The welding and cutting of the sheets may occur as the sheets are being formed by being wrapped around an elongate, generally cylindrical mandrel.

The sheets may originally be wound into coils, such as coil 102. A sheet may be unwound from coil 102 and wound onto mandrel 104 of jig 106. This may be accomplished by coupling ends of the sheets to the mandrel such that the sheets wrap around the circumference of the mandrel as the mandrel is rotated about a central longitudinal axis. The sheets may be coupled to the mandrel using any suitable method including, for example, drilling or cutting holes in the sheets and tying or bolting the sheets to the mandrel, by tack welding the sheets to the mandrel, by magnetically coupling the sheets to the mandrel using permanent magnets or electromagnets, by using vacuum or suction systems to hold the sheets to the mandrel, or by using suction cups to hold the sheets on the mandrel.

Mandrel 104 may be turned by an electric motor 107. Electric motor 107 may be, for example, a 30 HP variable speed AC inductive drive motor. As mandrel 104 is turned, a sheet may be caused to unwind from coil 102 and wind onto mandrel 104. All of the sheets forming the tank car outer jacket may be wound around mandrel 104 at the same time that the sheet from coil 102 is being wound around mandrel 104. Alternatively, sheets may be wound onto mandrel 104 one at a time, or in groups. For example, if it is desirable for the sheets to overlap adjacent sheets, a first group of sheets may be wound onto the mandrel spaced approximately one sheets width apart. A second group of sheets may then be wound onto the mandrel so as to cover the spaces between the first group of sheets and slightly overlap the edges of first group of sheets. Such an overlapping pattern of sheets may also be achieved by winding all of the sheets forming the tank car outer jacket around mandrel 104 at the same time, as will be discussed in more detail with regard to FIG. 5.

As the plurality of sheets are being wound around mandrel 104 the sheets may be coupled together by welding the sheets to adjacent sheets. Additionally, as the plurality of the sheets are being wound onto or off of mandrel 104, sections of one or more of the plurality of sheets may be cut away to leave holes, cutouts, or perforations (collectively "cutouts") at various locations, as desired.

As the plurality of the sheets are wound onto mandrel 104 the sheets may pass under a welding torch 108. Welding torch 108 may weld the seam between adjacent sheets as mandrel 104 is turned. If more than two sheets are being wound onto mandrel 104 more than one welding torch 108 may be used to weld the seams between the sheets. In particular embodiments, there can be at least one welding torch 108 for each seam. Alternative embodiments may share one or more welding torches 108 between multiple seams. Welding torches 108 may continuously weld the seams between adjacent sheets as the sheets are wound around mandrel 104, thereby producing a continuous, evenly welded seam line between adjacent sheets.

Welding torch 108 may itself include, or be part of a system including seam tracking capabilities. The seam tracking capabilities may include using digital imaging through arc or mechanical seam tracking. The welding torch may include or be coupled to such a tracking device and may thereby follow the seam being welded. Multiple welding torches may be utilized to weld more than one seam during a single weld cycle, and one or more seam tracking devices may be utilized to control the welding torches. The seam tracking capabilities may eliminate the need for tack welding prior to welding to hold the seams in place. Further, by controlling the weld process and surface speed of the mandrel, welding speeds (IPM) and quality may be increased.

The drive for the mandrel itself may include variable speed capability and have position sensing capability with respect to the de-coiled sheets. Automatic seam tracking may also be enhanced by the ability to maintain straight seams due to the coil alignment adjustment ability of the coil support illustrated in FIGS. 6 and 7 and described below. The drive system may also have provision for positioning encoders, real time variable speed changes, and position holding capabilities.

System 100 may also include a cutting torch or torches 110. Cutting torch 110 may be used to remove cutouts from the sheets or may be used to perforate, or stitch cut, sections of the sheets. Cutouts may be removed when part of the tank car, such as an inlet or outlet port, must pass through the tank car outer jacket through the cutout section. It may be desirable to perforate the sheet metal where a section may need to be removed at a later time, or to facilitate the separation of an outer jacket from the coil 102 and/or from an adjacent jacket or jackets when multiple outer jackets have been wound onto mandrel 104 as a continuous sheet. The cutting torch or torches 110 may be dedicated to a particular sheet or sheets or may be mounted so as to be movable between or along some or all of the sheets. In a particular embodiment, cutting torch 110 may be a five axis robot utilizing a plasma cutting head to remove the cutouts from the jacket.

Coil 102 may be held by a coil support 112. Coil support 112 may include a generally rectangular frame of sufficient dimension and strength to support coil 102. Coil support 112 may also include one or more vertical anti-telescoping arms 114. Anti-telescoping arms 114 may include one or more rollers 116. Coil support 112 may also include a tensioner 117 to maintain a tension in the sheets being wound onto mandrel 104. Furthermore, coil support 112 may be mounted on a track 118, and may be moveable upon track 118 using wheels 119. Coil 102 may rest on coil support 112 on one or more rollers 124. Coil support 112 and the various components of coil support 112 will be described in more detail in the descriptions of FIGS. 6 and 7.

During de-coiling of sheets from the coil to the mandrel, the sheets may tend to spiral onto the outer diameter of the mandrel. This may result in buckling or irregular seams that are not parallel with other coil seams. Previously, the system may have been reversed to re-align the coil. In some instances, the entire sheet would be removed from the mandrel. The straightness of each sheet has an effect on subsequent operations, such as welding and cutting. To prevent the coil from spiraling onto the mandrel, a level wind de-coil device may be used, such as coil alignment sensor 120. Coil alignment sensor 120 may be operable to detect that a sheet from coil 102 has become misaligned relative to mandrel 104. Coil alignment sensor 120 may include a plurality of sensors near a tangent point where the coil enters onto the mandrel. Coil alignment sensor 120 may be operable to communicate the misalignment to a controller of coil support 112, which in turn may be operable to realign coil support 112 by moving it on track 118.

System 100 may also include a flat side forming carriage 122. Flat side forming carriage 122 may be used to form a flat side on the tank car outer jacket such that when the tank car outer jacket is assembled on the tank car the overall dimensions of the tank car with the outer jacket will not exceed desirable and/or maximum allowable dimensions for a tank car. The flat side forming carriage will be described in more detail with reference to FIGS. 8 and 9 below.

A complete tank car outer jacket may be rolled, welded, cut, and formed in one rotation of mandrel 104. Each of these steps may be occurring simultaneously as the sheets are wound onto the mandrel 104. If only one tank car outer jacket is desired, or if it is desirable to only make one tank car outer jacket at a time, the completed tank car outer jacket may be cut from the coils used to form it, removed from the mandrel, installed, stored, or left on the mandrel until needed. If it is desirable to make more than one tank car outer jacket, more than one tank car outer jacket may be fabricated and wrapped around the mandrel at a time. For instance, if two tank car outer jackets are desired, the mandrel may be turned once, forming the first tank car outer jacket, and then the mandrel may be turned again, forming the second tank car outer jacket. This may be repeated for practically any number of tank car outer jackets.

The tank car outer jackets may be stored on the mandrel until assembly onto a tank car, or the jackets may be transferred to a separate roll for storage. In either case, the tank car outer jackets may be unrolled from the mandrel and cut from the remaining tank car outer jackets for final assembly or separate storage.

In some embodiments, the intersection of two tank car outer jackets may be stitch cut, or perforated, to facilitate later cutting. Perforating may not only reduce the amount of time required to make the later cut, but may also indicate to a person or robot where to make the cut. Perforation may thereby eliminate the need to measure the jacket prior to cutting it from the remaining jacket or jackets. Forming more than one tank car outer jacket on the mandrel also allows for bulk fabrication of the tank car outer jackets, which may be stored for later use.

Some or all of welding torches 108 and cutting torches 110 may be robotic or automated torches. These torches may be coupled for communication with a programmable logic controller (PLC). The PLC may also be coupled to the drive motor 107 of mandrel 104, and to the coil alignment sensors 120 and coil support 112. In this manner the PLC may control the speed of mandrel 104 and the locations of welds, cuts, and perforations. The PLC may be used to simplify and streamline the fabrication of a complete tank car outer jacket in one turn of the mandrel by synchronizing the rolling, welding, cutting, and forming steps to occur simultaneously and/or in a proper order and at proper times.

Using a PLC with the above system may have the further advantage of streamlining fabrication of subsequent tank car outer jackets by allowing storage of the jacket plans. Once a design for a tank car outer jacket has been programmed into the PLC, the program may be stored and reloaded to fabricate practically identical tank car outer jackets. Designs may also be created by customers or outside engineers and transferred to the manufacturing facility computers or PLC. This reduces the time required for laying out, welding, and cutting subsequent jackets. Using a PLC can thereby decrease turn around time on customer orders and increase consistency between orders. Combining the PLC with the ability to fabricate a tank car outer jacket with a single revolution of mandrel 104 may also increase capacity and output volume.

Figure 2:
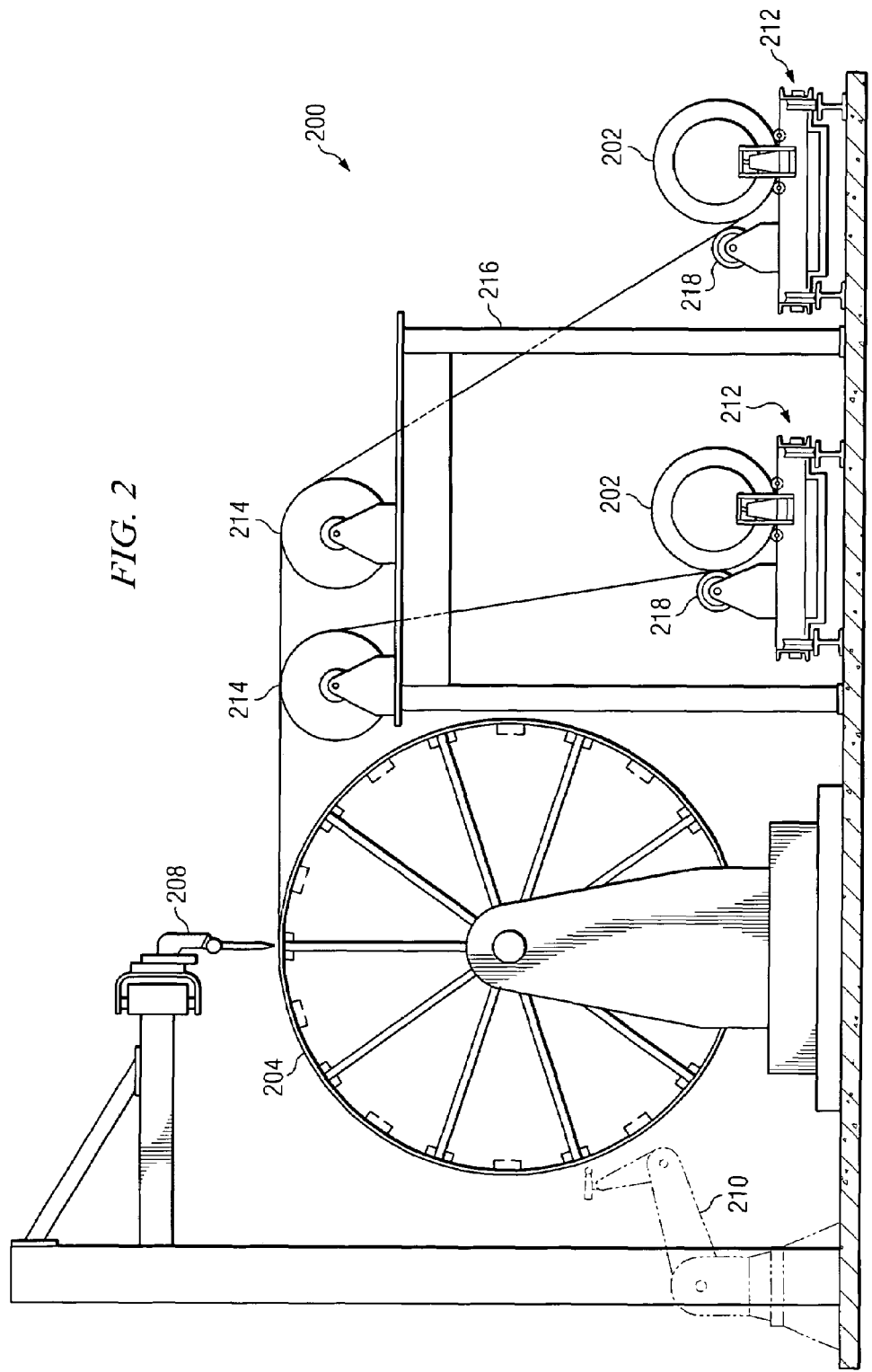
FIG. 2 illustrates a side view of an alternative embodiment of an apparatus to roll, cut, weld, and form tank car outer jackets by welding sheets of sheet metal as the sheets are wound onto a mandrel in accordance with the teachings of the present invention.

FIG. 2 illustrates an alternative embodiment of an apparatus to roll, cut, weld, and form tank car outer jackets. System 200 includes sheets being unwound from coils 202 and being wound onto mandrel 204. System 200 differs from system 100 as the sheets are wound onto the top of mandrel 204 rather than around the bottom. Welding torches 208 have been placed at the top of mandrel 204 proximate where the sheets contact mandrel 204. By locating the welding torches at the contact point of the sheets with mandrel 204, the need for separate supports to hold the sheets proximate welding torches 208 may be eliminated. Welding the sheets as the sheets contact the mandrel also reduces the potential for misalignment of the sheets relative to one another and mandrel 204 as the sheets are wrapped around mandrel 204. Wrapping the sheets around mandrel 104 from the top of mandrel 104 may allow for the various components of system 200 to be spaced further apart. Welding torches 208 may be advantageously placed as discussed above, without interfering with coil supports 212 or other components of system 200, which may be placed between coil supports 212 and mandrel 204.

The sheets are guided from coils 202 to the top of mandrel 204 by guide wheels 214. Guide wheels 214 may be idler wheels, may be motorized to aid the winding of the sheets onto mandrel 204, or may impart a drag force onto the sheets being fed onto mandrel 204. Imparting a drag force to the sheets may be desirable to maintain tension in the sheets as the sheets are wound onto mandrel 204. The guide wheels 214 may be supported on an elevated platform 216, which may elevate the top of the guide wheels 214 to the same level as the top of mandrel 204.

The system 200 may also include a cutting torch 210. Cutting torch 210 may cut or perforate sections of the sheets as they are wound onto mandrel 204. In alternative embodiments, cutting torch 210 may not be used, or may be relocated so as to be able to cut sections from the sheets when the sheets are between coil supports 212 and guide wheels 214, or guide wheels 214 and mandrel 204.

Coil supports 212 support coils 202 as the sheets are unwound from coils 202 onto mandrel 204. Coil supports 212 include rollers 218 to help guide the sheets from coils 202. Rollers 218 may be idlers, may be motorized to aid the winding of the sheets onto mandrel 204, or may impart a drag force onto the sheets being fed onto mandrel 204.

Coil supports 212 may be alternatingly arranged along the length of mandrel 204 such that every other coil support 212 is spaced relatively further away from mandrel 204 than the intermediate coil supports 212. Such an alignment may facilitate the simultaneous winding of sheets from practically any number of coils 202 supported by coil supports 212. The relative alignments of coil supports 212 will be described in more detail with reference to FIG. 5. The relative alignments of guide wheels 214 may correspond to the relative alignments of coil supports 212. In an alternative embodiment, coil supports 212 may be elevated to eliminate guide wheels 214. In such an embodiment, the sheets may be unwound from the top of coils 202, rather than being unwound from the side as illustrated.

Figure 3:
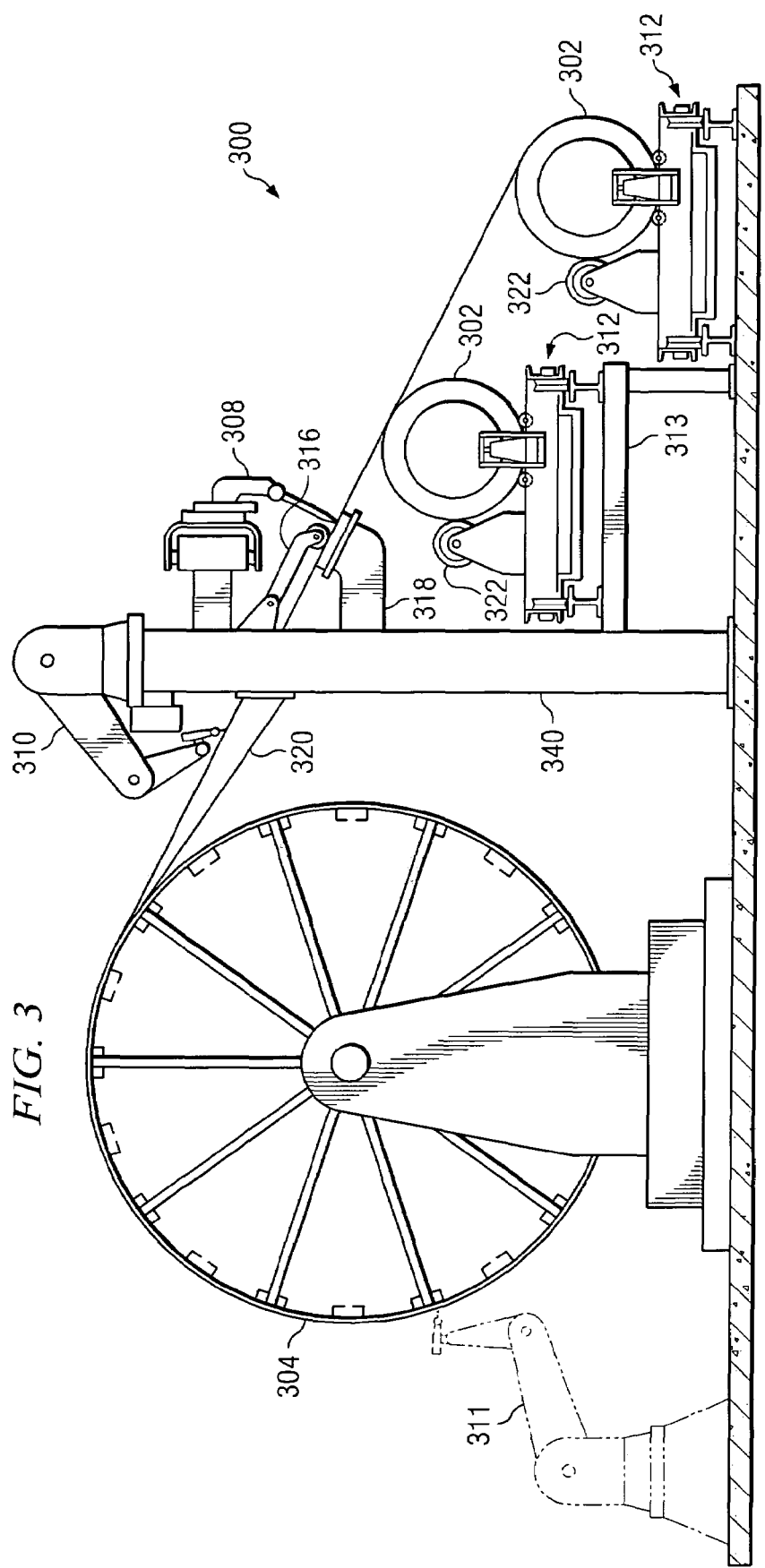
FIG. 3 illustrates a side view of a particular embodiment of an apparatus to roll, cut, weld, and form tank car outer jackets by cutting cutouts from sheets of sheet metal and welding the sheets together before winding the sheets onto a mandrel in accordance with the teachings of the present invention.

FIG. 3 illustrates a side view of a further alternative embodiment of an apparatus to roll, cut, weld, and form tank car outer jackets. System 300 includes sheets being unwound from coils 302 onto mandrel 304. The coils of sheet metal 302 rest on coil supports 312. Coil supports 312 may include rollers 322. Rollers 322 may help hold the coils 302 in place on coil supports 312 and may also assist in preventing telescoping of coils 302.

Coil supports 312 are alternatingly arranged along the length of the mandrel. Every other of the coil supports 312 may be spaced relatively further away from mandrel 304 than the intermediate coil supports 312. The intermediate coil supports may also be vertically elevated relative to the other coil supports 312. Coil supports 312 may be vertically offset from each other by raising certain ones of the coil supports 312 on platforms 313. Horizontally offsetting (in two dimensions: into the page, and relative to the mandrel) and vertically offsetting coil supports 312 and thereby coils 302 from each other may facilitate simultaneous unwinding of a plurality of sheets from coils 302. The relative horizontal spacing of coil supports 312 along the length of mandrel 304 (i.e., into the page) may determine the existence and amount of overlap or distance between the sheets uncoiled from coils 302 and wound on mandrel 304.

As the sheets are unwound from coils 302 onto mandrel 304 the sheets will pass under a welding torch 308. Welding torch 308 is operable to weld together adjacent sheets as they pass under welding torch 308. The sheets are held against backing 318 by a tensioning wheel 316. Tensioning wheel 316 is operable to hold the sheets against the backing 318, or, if a lap joint is desired between adjacent sheets, the tensioning wheel 318 may hold the overlapping sections of adjacent sheets together. In particular embodiments, backing 318 may be a copper backing and/or may be cooled, such as by, for example, flowing water through backing 318.

System 300 also includes cutting torches 310 and 311. Cutting torches 310 and 311 may be used alone or in combination to cut out or perforate sections of sheets as they are wound onto or off of mandrel 304.

The welding torches 308 and cutting torches 310 are illustrated being mounted to a central support 340. An advantage of locating welding torches 308 and cutting torches 310 to central support 340 between the coils 302 and mandrel 304 is that the welding and cutting of the sheets can be completed prior to the sheets contacting mandrel 304. This may be desirable when more than one tank car outer jacket will be wrapped around mandrel 304 at the same time. Various other components of system 300 may also be coupled to central support 340, including guide 320, backing 318, tensioning wheel 316, and platform 313.

Figure 4:
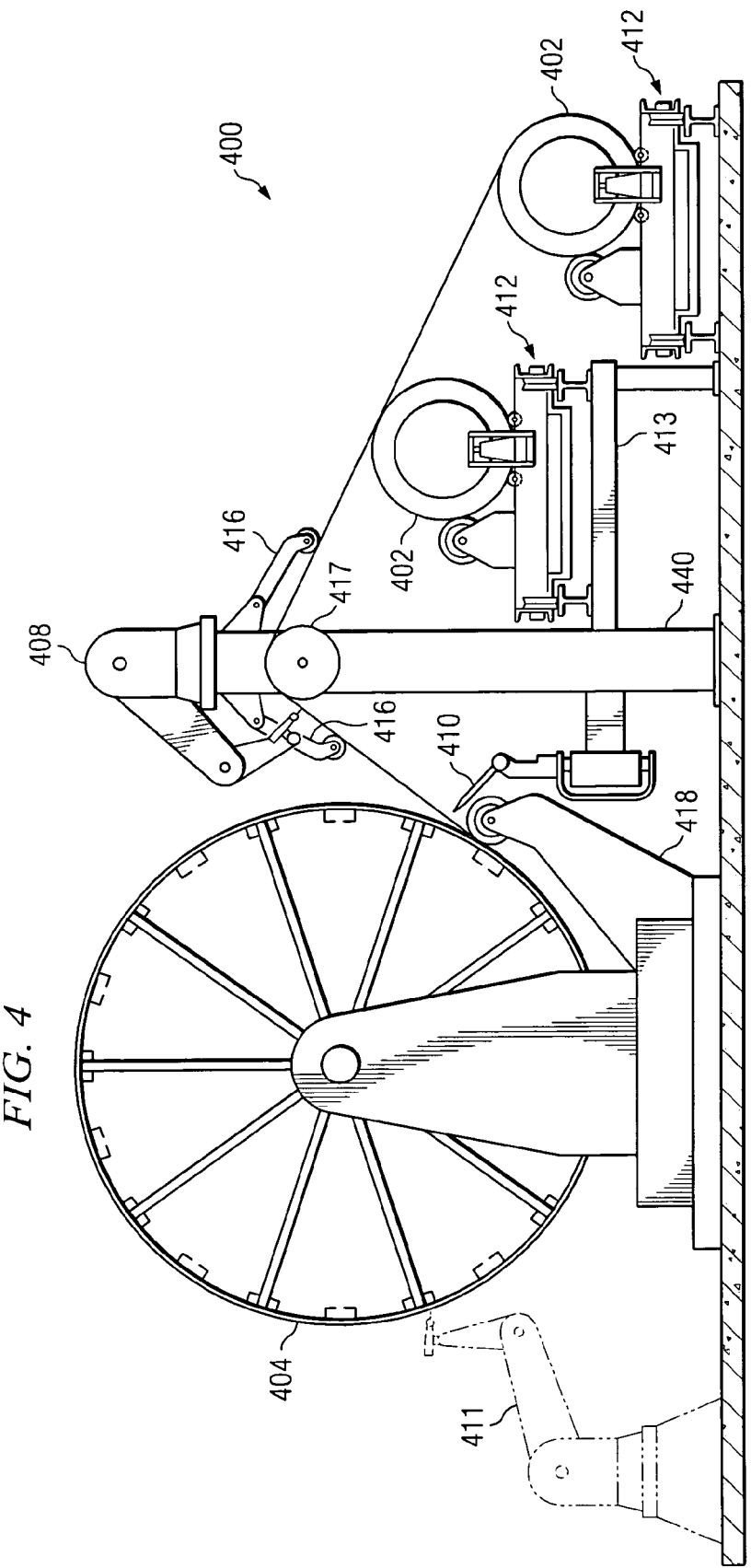
FIG. 4 illustrates a side view of a particular embodiment of an apparatus to roll, cut, weld, and form tank car outer jackets by cutting cutouts from sheets of sheet metal and welding the sheets together before winding the sheets onto a mandrel in accordance with the teachings of the present invention.

FIG. 4 illustrates an additional alternative embodiment of an apparatus to roll, cut, weld, and form tank car outer jackets. System 400 includes sheets being unwound from coils 402 over a guide wheel 417 and onto a mandrel 404. As described in FIG. 3 regarding system 300, system 400 may include coil supports 412 being vertically and horizontally offset. Likewise, alternating coil supports may be supported on an elevated platform 413.

System 400 may include one or more tensioning wheels 416 on either side of guide wheel 417. Tensioning wheels 416 may help insure the sheets move smoothly over guide wheel 417, and/or may be used in conjunction with a backing to hold the sheets a specific desired distance from cutting torches 408. Cutting torches 408 may be located on either side of guide wheel 417 and may serve to cut the portions of the sheets while they are being wound onto or off of mandrel 404. System 400 may also include an optional cutting torch or torches 411. Cutting torches 408 and 411 may be used alone or in combination to cut or perforate portions of sheets unwound from coils 402 onto mandrel 404.

System 400 also includes welding torches 410. Welding torches 410 may be used to weld the seams of adjacent sheets. System 400 may also include a tensioning wheel 418 located proximate mandrel 404 and/or welding torches 410. Tensioning wheel 418 may hold the sheets against mandrel 404 to insure proper winding of the sheets onto the mandrel and/or to properly tension the sheets for welding by welding torches 410.

Cutting torches 408 and welding torches 410 are illustrated as mounted to a central support 440. Central support 440 may be located between the coils 402 and mandrel 404. Mounting cutting torches 408 and welding torches 410 to central support 440 may allow the cutting and welding of the sheets to occur prior to the sheets being wound onto mandrel 404. This may be desirable when more than one tank car outer jacket will be wrapped around mandrel 404 at the same time. Various other components of system 400 may also be coupled to central support 440, including guide wheel 417, tensioning wheels 416, platform 413, and backings used for welding or cutting the sheets.

While FIGS. 1 through 4 have illustrated various embodiments of an apparatus to roll, cut, weld and form tank car outer jackets, numerous alterations and variations may be imagined by one of ordinary skill in the art, and the present invention is meant to encompass such variations. For example, the cutting torches and welding torches may be interchanged in their locations, or may be placed in practically any locations relative to the mandrel. Furthermore, the mandrels may be any desired length and the coils of sheet metal may be of any desired width, length, and gauge. Additionally, practically any number of coils may be aligned adjacent to each other along the length of the mandrel as permitted by the length of the mandrel. Sheets may overlap adjacent sheets, or may abut adjacent sheets. If the adjacent sheets overlap, they may be lap welded such that they are coupled to one another in an overlapping fashion. If the adjacent sheets abut each other they may be butt welded such that adjacent sheets are approximately flush with one another.

Figure 5:
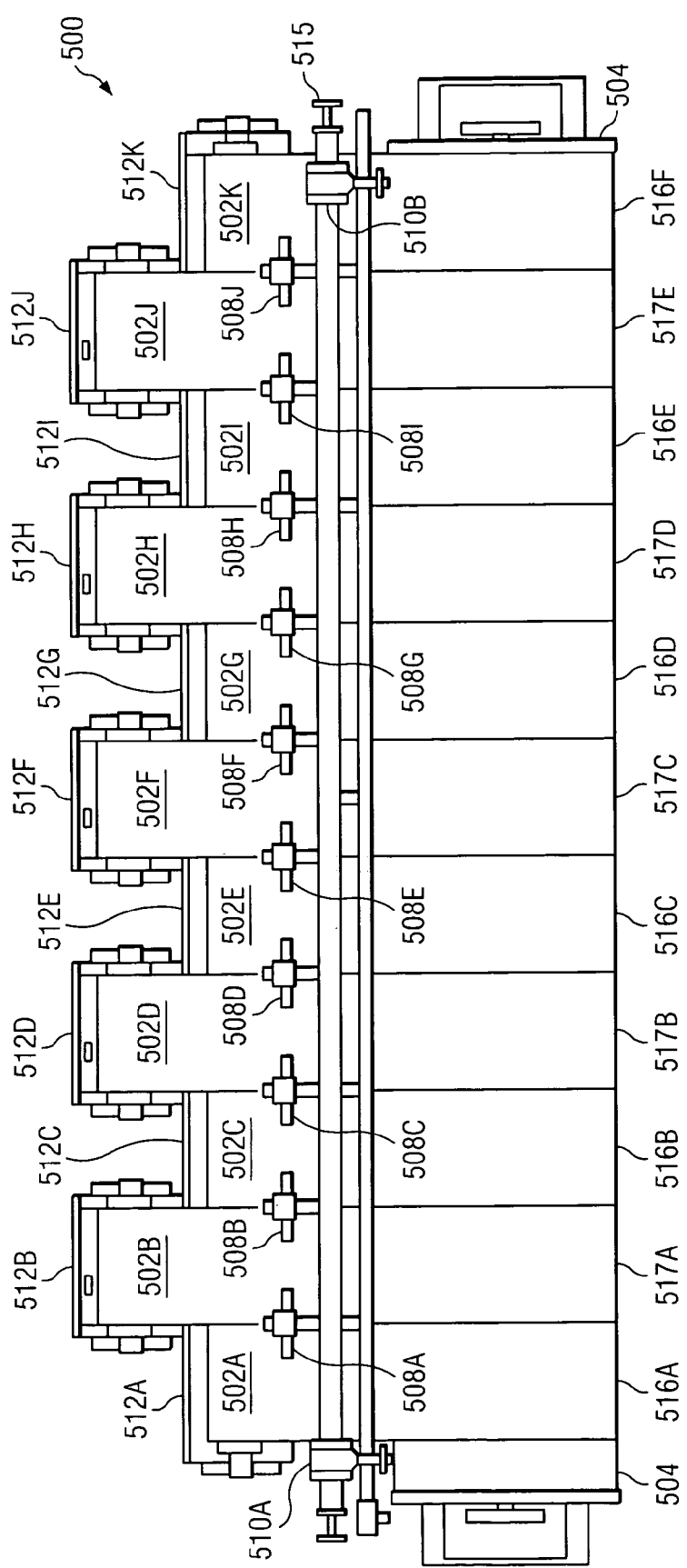
FIG. 5 illustrates a top view of a particular embodiment of a system for unwinding sheets of sheet metal from coils of sheet metal onto a mandrel situated adjacent the coils, in accordance with the teachings of the present invention.

FIG. 5 illustrates a top view of one embodiment of a layout of coil supports and coils next to a mandrel 504 that may be used in conjunction with one of the above-described apparatus to roll, cut, weld and form tank car outer jackets. System 500 includes coils 502a-502k supported by coil supports 512a-512k. The coils 502a-502k and coil supports 512a-512k are arranged along the length of mandrel 504. The coils 502a-502k and coil supports 512a-512k are arranged in an alternating fashion such that sheets 516a-516f and 517a-517e may be simultaneously wound onto mandrel 504. Coil supports 512a-512k may be horizontally offset (i.e., spaced closer to or further from the mandrel) and/or vertically offset (i.e. coil supports 512a, 512c, 512e, 512g, 512*i*, and 512*k* raised off the ground higher than coil supports 512*b*, 512*d*, 512*f*, 512*h*, and 512*j*, or vice versa) from each other with respect to mandrel 504.

The sheets 516*a*-516*f* and 517*a*-517*e* may overlap or abut adjacent sheets depending, in part, on the arrangement of coil supports 512*a*-512*k*. If it is desirable to have a lap joint between adjacent sections of sheet metal 516*a*-516*f* and 517*a*-517*e*, then coil supports 512*b*, 512*d*, 512*f*, 512*h*, and 512*j* may be set behind the coil supports 512*a*, 512*c*, 512*e*, 512*g*, 512*i*, and 512*k*, relative to mandrel 504. Such an arrangement would allow sheets 517*a*-517*e* to be wound to mandrel 504 at the same time as sheets 516*a*-516*f*, while allowing practically any amount of overlap of sheets 517*a*-517*e* over sheets 516*a*-516*f*. The above described alternating arrangement of coil supports may be used with any number of coil supports and corresponding coils, and may be used with or without a vertical offset of the coil supports.

Regardless of whether sheets 517*a*-517*e* overlap or abut adjacent sheets 516*a*-516*f*, adjacent sheets may be welding together as they pass under welding torches 508*a*-508*j*. In the illustrated embodiment, system 500 includes one welding torch, for example, one of 508*a*-508*j*, for each seam between adjacent sheets, for example, one of 516*a*-516*f* and one of 517*a*-517*e*. Alternative embodiments may include fewer than one, or more than one, welding torch 508*a*-508*j* per seam. Welding torches 508*a*-508*j* are also illustrated over the sheets 516*a*-516*f* and 517*a*-517*e* at a point before sheets 516*a*-516*f* and 517*a*-517*e* are wound onto the mandrel. However, welding torches 508*a*-508*j* may be placed under sheets 516*a*-516*f* and 517*a*-517*e*, and/or may be placed at any point around mandrel 504.

In the illustrated embodiment, system 500 has two cutting torches 510*a* and 510*b*. In particular embodiments, torches 510*a* and 510*b* may form a two axis plasma cutting system operable to traverse the length of a beam, or guide pole 515, to cut the jacket to length. The torches 510*a*-510*b* may slide along guide pole 515 and/or may be driven by internal or external electrical motors and/or other drive systems. In this manner, a limited number of torches, such as, for example, two, may be used to make the desired cut-outs from the sheets 516*a*-516*f* and 517*a*-517*e*. Alternative embodiments may include only one cutting torch or may include more than two cutting torches.

Figure 10:
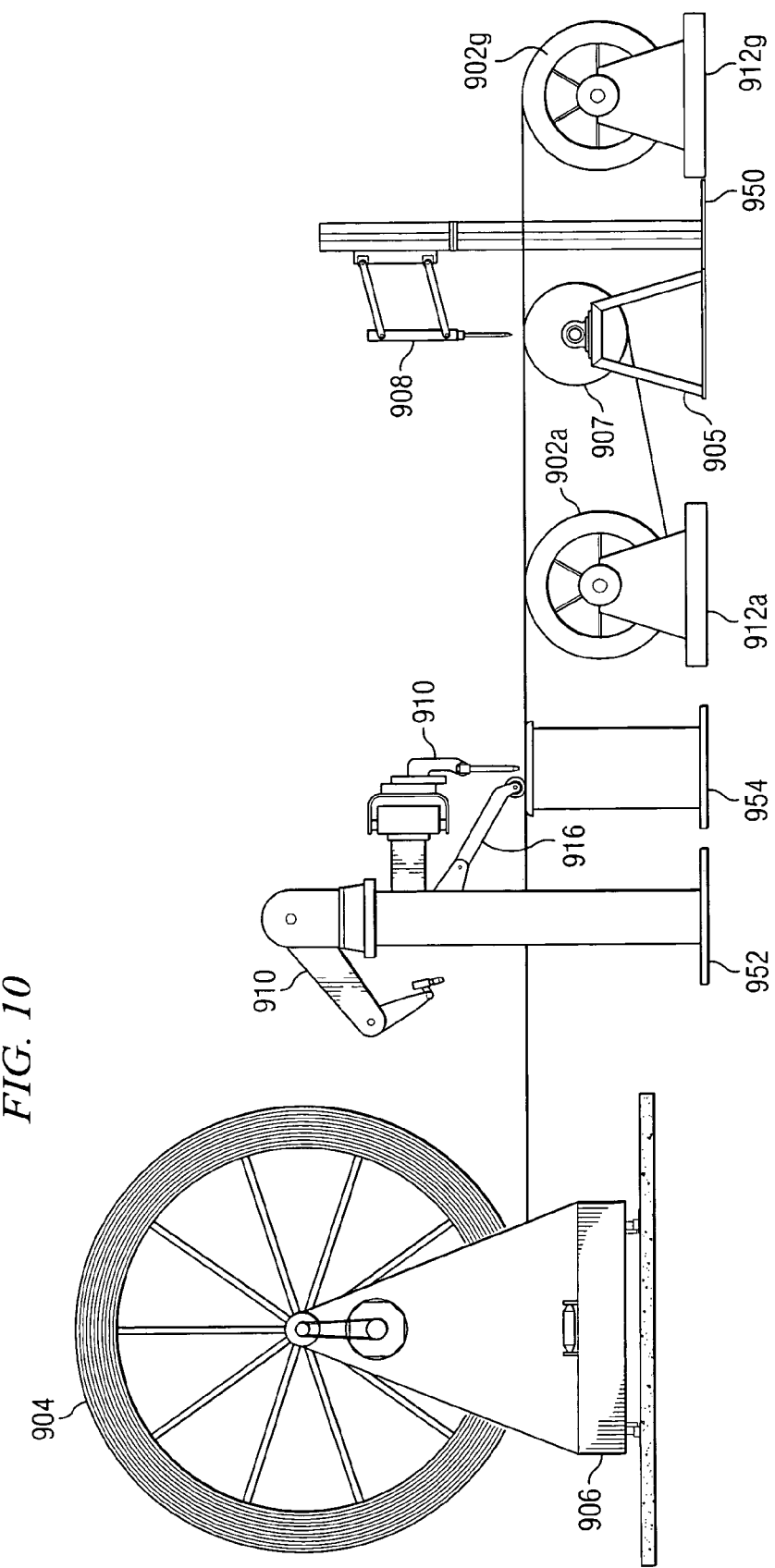
FIG. 10 illustrates a side view of a particular embodiment of an apparatus to roll, cut, weld, and form tank car outer jackets by cutting cutouts from sheets of sheet metal and welding the sheets together before winding the sheets onto a mandrel in accordance with the teachings of the present invention.
Figure 11:
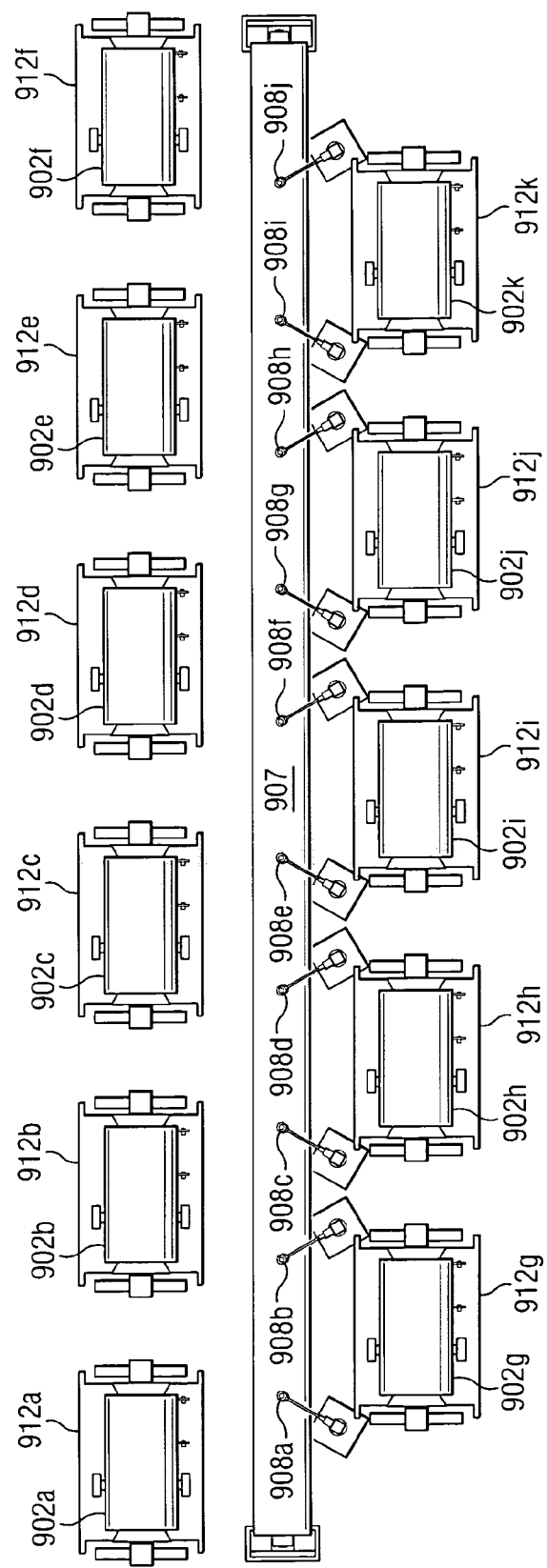
FIG. 11 illustrates a top view of an uncoiling and welding apparatus used in the apparatus to roll, cut, weld, and form tank car outer jackets illustrated in FIG. 10, in accordance with the teachings of the present invention.

FIGS. 10 and 11 illustrate a further embodiment of an apparatus to roll, cut, weld, and form tank car outer jackets. Similarly to the previously described embodiments, sheets of sheet metal may be unwound from coils 902*a*-902*k* and wound onto mandrel 904 of jig 906. As the sheets are being unwound from coils 902*a*-902*k* onto mandrel 904, each of the sheets may be welded to adjacent sheets and have portions cut from them. The embodiment illustrated in FIGS. 10 and 11 is unique from the previously described embodiments as it utilizes a small diameter mandrel 907 to assist in the alignment and welding of the sheets.

Small diameter mandrel 907 may be part of a jig 905 disposed between two approximately parallel rows of coils 902 supported by coil supports 912. As illustrated in FIG. 11, small diameter mandrel 907 is disposed between a first row of coils 902*a*-902*f*/coil supports 912*a*-912*f* and a second row of coils 902*g*-902*k*/coil supports 912*g*-912*k*. Sheets from the first row of coils 902*a*-902*f* are wound around small diameter mandrel 907 from the bottom to the top, where the sheets from coils 902*a*-902*f* are aligned with sheets from coils 902*g*-902*k* being fed over the top of small diameter mandrel 907.

As the sheets from coils 902*a*-902*k* are fed over the top of small diameter mandrel 907, adjacent sheets are welded together by welding torches 908*a*-908*j*. Welding torches 908*a*-908*j* may be arranged on either side of each of coil supports 912*g*-912*k* and may be mounted on pedestals 950, which may rest on or be coupled with the ground, a floor, or an elevated platform.

In the illustrated embodiment, there is one welding torch 908*a*-908*j* for each seam between adjacent sheets. The system may be used to weld any number of seams, and therefore the number of welding torches may be practically any number to accommodate the number of seems. Welding torches 908*a*-908*j* may also be arranged over approximately the top center of small diameter mandrel 907 along a line approximately parallel to a central longitudinal axis of small diameter mandrel 907. Such an arrangement facilitates welding the seems between adjacent sheets as small diameter mandrel 907 may provide a backing for welding.

The first row of coil supports 912*a*-912*f* and the second row of coil supports 912*g*-912*k* may be spaced along the length of small diameter mandrel 907 such that the edges of adjacent sheets abut or overlap. If it is desirable for the edges of adjacent sheets to overlap, the sheets from the second row of coils 902*g*-902*k* may overlap the sheets from the first row of coils 902*a*-902*f*. The relative spacing of coil supports 912 within the first or second rows may be adjusted to set the amount of overlap. Eleven coil supports 912*a*-912*k* have been illustrated, but practically any number of supports 912 may be utilized to form a desired size of tank car outer jacket with practically any amount of overlap between adjacent sheets.

Adjacent sheets of sheet metal may be welded by welding torches 908 as the sheets pass over the top of small diameter mandrel 907. The welded sheets may then pass under cutting torches 910 before being wound onto mandrel 904. FIG. 10 illustrates a tensioning wheel 916 arranged so as to apply pressure to the sheets passing under cutting torches 910 and hold the sheets against a backing stand 954 as the sheets travel over backing stand 954. Backing stand 954 may provide a rigid surface to perform the cutting against, and may be actively cooled, such as by, for example, a circulating fluid.

Cutting torches 910 may be mounted to a stand 954 between small diameter mandrel 907 and mandrel 904. Performing the welding and cutting of the sheets prior to winding the welded and cut sheets onto the mandrel 904 allows more than one layer of sheets to be wound around mandrel 904 without damaging the underlying layers. In many embodiments the outer circumference of mandrel 904 may be approximately equal to the inner circumference of one tank car outer jacket. Wrapping several layers of sheets around mandrel 904 enables multiple tank car outer jackets to be fabricated without resetting the system. Multiple tank car outer jackets may be fabricated during a single continuous process, and the tank car outer jackets may be stored on mandrel 904 until needed.

Figure 6:
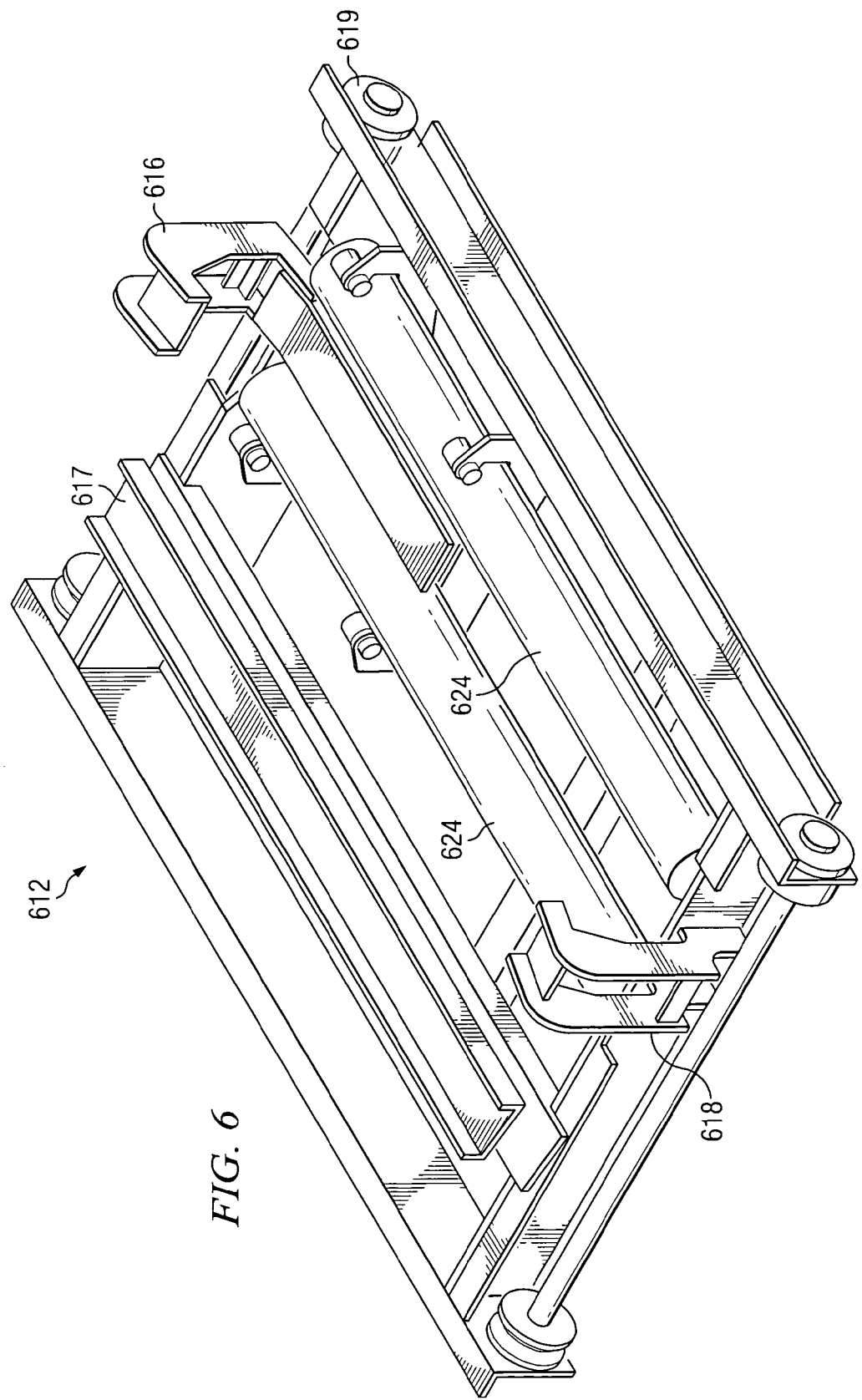
FIG. 6 illustrates a perspective view of a particular embodiment of an apparatus to support coils of sheet metal as sheets of sheet metal are unwound from the coils and wound onto a mandrel situated adjacent the coils, in accordance with the teachings of the present invention.
Figure 7:
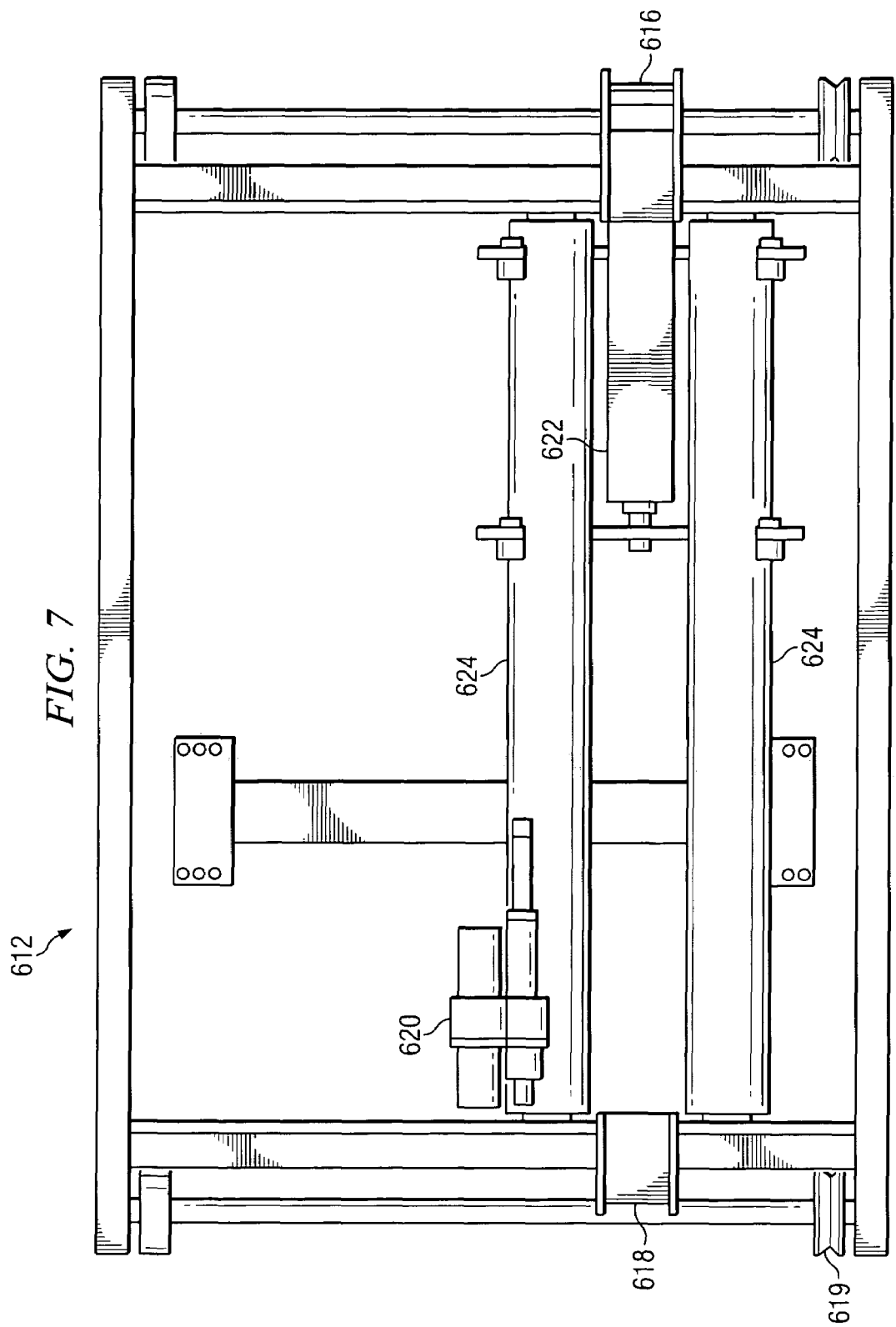
FIG. 7 illustrates a top view, with portions removed, of the apparatus to support coils of sheet metal illustrated in FIG. 6, in accordance with the teachings of the present invention.

FIGS. 6 and 7 illustrate one embodiment of a coil support 612 operable to hold and align a coil of sheet metal as the coil is unwound. Coil support 612 may include rollers 624. Rollers 624 may allow coils of sheet metal to rotate smoothly on coil support 612 without rolling off or binding.

Coil support 612 also includes vertical anti-telescoping arms 616 and 618. Anti-telescoping arms 616 and 618 may prevent a coil being supported by coil support 612 from telescoping. Telescoping is the tendency of subsequent layers below the layer being de-coiled to move or creep toward the edges of the coil such that the coil expands along a line parallel to the central longitudinal axis of the coil. Telescoping may be undesirable as it may adversely effect the alignment of the sheets on a mandrel. The ends of the coil may not remain square and this may allow spiraling and twisting of the coil as it conforms to the mandrel diameter. As it may be desirable to use coil support 612 for different lengths of coil, anti-telescoping arm 616 may be adjustably coupled to coil support 612. In particular embodiments, anti-telescoping arm 616 may be adjustable to accommodate coil widths from 52" to 72". Furthermore, anti-telescoping arm 616 may be adjustable using a mechanical or electrical actuator 622. Actuator 622 may be a screw or an electrical motor capable of moving anti-telescoping arm 616 relative to anti-telescoping arm 618.

Anti-telescoping arms 616 and 618 may also include vertical rollers as illustrated in FIG. 1. Use of such rollers may allow a coil to rotate on coil support 612 without unnecessary drag caused by the compression of the coil between anti-telescoping arms 616 and 618.

Coil support 612 may also include a tensioner 617. Tensioner 617 may include two relatively flat bars capable of compressing a sheet of sheet metal between them. Tensioner 617 may thereby be used to introduce a drag force onto a sheet being wound onto a mandrel such that the sheet remains taut between the tensioner 617 and the mandrel.

In certain embodiments, coil support 612 may be mounted on a track system using wheels 619. Wheels 619 may allow coil support 612 to roll along the tracks. The tracks may run approximately parallel to the mandrel along the length of the mandrel. The ability to roll coil support 612 along the length of the mandrel allows for positioning of coil support 612 relative to the mandrel and other coil supports. The ability to position coil support 612 may also allow for minor corrections in the alignment of a sheet being wound onto the mandrel. Coil support 612 may be moved along the tracks using an electric motor or actuator 620. Actuator 620 may receive instructions from a coil alignment sensor such as that illustrated in FIG. 1. Actuator 620 will translate the direction of the carriage to reverse the tendency of the de-coiling material to spiral. Coil support 612 thereby orients the coil at right angles to the mandrel and consistently feeds the coil during welding operations. Both the quality of the welds and the linear weld travel speed may be improved by consistent feeding of the coil.

FIGS. 8 and 9 illustrate a flat side forming carriage 822. Flat side forming carriage 822 may include a plurality of rollers 802, 804, and 806 mounted to a frame 810. Frame 810 and rollers 802, 804, and 806 may be raised relative to the remainder of flat side forming carriage 822 by a lift 814. Lift 814 may be, for example, a screw jack, ratcheting jack, pneumatic lift, or hydraulic lift. As frame 810 is raised, the plurality of rollers 802, 804, and 806 will contact the tank car outer jacket on the mandrel and cause a deformation of the portion of the jacket contacted by the rollers 802, 804, and 806. Flat side forming carriage 822 may include wheels 812 for mounting flat side forming carriage 822 on a track. Flat side forming carriage 822 may be run along the track and thereby run along a tank car outer jacket to deform a length of the tank car outer jacket using rollers 802, 804, and 806.

In certain embodiments of the above-described invention one complete tank car outer jacket may be rolled, cut, welded and formed at a time. In an alternative embodiment multiple jackets may be wound onto the mandrel as a single continuous sheet. In particular embodiments a perforation may be made at the end of the length of one tank car outer jacket and the beginning of the next. In this manner the tank car outer jackets may be unrolled one at a time and cut from the mandrel for final assembly onto the tank car. In certain embodiments the cutting of cutouts from the sheets may occur as the sheets are being wound onto the mandrel. In alternative embodiments the cutouts may not be removed until the sheets are being removed from the mandrel. In a further embodiment, certain cuts may be made during winding and certain cuts during unwinding. In certain embodiments, no cutting may be performed in the first winding. Rather, the de-coiling and welding steps can occur, and the weldment may be stored on a spool or mandrel. The mandrel may store multiple wraps of welded jacket strips similar to a roll of adding machine paper. When a jacket is required, the welded material may be de-coiled from the mandrel. As the de-coiling is in progress, the automated plasma cutting of access panels and other cutouts may take place along with cutting the jacket to length.

In certain embodiments some or all of the mandrels, cutting torches, welding torches, coil alignment sensors, coil alignment actuators, flat side forming carriage, tensioners, and anti-telescoping actuators may be controlled by a central computer or a programmable logic controller (PLC). Additionally, any or all of the cutting torches or welding torches may include robotic or automated arms. In such a system, the relative speeds, timing, and interactions of the various components may be controlled and harmonized by the PLC to perform many or all of the steps simultaneously and to complete the entire process without interruption. According to the above teachings the entire process of tank car outer jacket formation may be automated and streamlined. Human error and production time may be reduced and capacity increased.

Advantages of the various systems described above may include some or all of the following: precision alignment of the coil with the mandrel; sensors and actuators to maintain coil carriage locations; programmable spindle drive controls with adaptive feed back that maintain consistent welding and cutting speeds; seam tracking devices and the ability to weld as the coil is de-coiled; coordinated axis for plasma cutting the nozzles, vents, and bolster clearance areas; pre-programming and selection of programs for specific jackets; elimination of coil telescoping during processing; the ability to flatten the jacket sides without external welding, fabrication, or elaborate equipment; flexibility to make any mix or model of jacket at any time with various dimensions without set up or change over time; elimination of potentially dangerous handling and lifting; the ability to download production requirements and cutting requirements directly from engineering specifications; utilization of multi-axis and programmable robots for plasma cutting; the ability to align, weld, and cut a complete jacket with one revolution or pass through the system; having bulk welded jacket material available as jackets are required; flexibility of welding bulk coil ahead of requirements; bulk welded material of various widths could be stored; reduced rework and cleaning time of welds; and flexibility of the fabrication process.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of fabricating tank car outer jackets, comprising:
supporting a plurality of coils of sheet metal on a plurality of coil supports such that the central longitudinal axes of the plurality of coils are generally parallel to a central longitudinal axis of a mandrel adjacent the plurality of coils;

unwinding a plurality of sheets of sheet metal from the plurality of coils by rotating each of the plurality of coils generally about the respective central longitudinal axes of each of the plurality of coils;

winding the plurality of sheets of sheet metal onto the mandrel;

welding together adjacent sheets of the plurality of sheets of sheet metal, using a plurality of automated welding torches proximate the mandrel, as the plurality of sheets of sheet metal are wound onto the mandrel; and the plurality of automated welding torches being coupled for communication with a programmable logic controller.

2. The method of claim 1, wherein each of the plurality of sheets of sheet metal are wound onto the mandrel at the same time.

3. The method of claim 1, further comprising cutting portions from one or more of the plurality of sheets of sheet metal using a plurality of automated cutting torches as the plurality of sheets of sheet metal are wound onto the mandrel.

4. The method of claim 3, wherein the plurality of automated cutting torches are coupled for communication with the programmable logic controller.

5. The method of claim 3, further comprising welding and cutting sections of the plurality of sheets of sheet metal before the sections of the plurality of sheets of sheet metal contact the mandrel.

6. The method of claim 3, further comprising cutting sections of the plurality of sheets of sheet metal after the sections of the plurality of sheets of sheet metal have contacted the mandrel.

7. The method of claim 1, further comprising welding together adjacent sheets of the plurality of sheets of sheet metal after the sheets of the plurality of sheets of sheet metal contact the mandrel.

8. The method of claim 1, further comprising arranging the plurality of coil supports such that adjacent sheets of the plurality of sheets of sheet metal overlap as the plurality of sheets of sheet metal are wound onto the mandrel.

9. The method of claim 8, further comprising holding overlapping sections of the adjacent sheets of sheet metal together, using a plurality of tensioning wheels proximate the plurality of automated welding torches, as the overlapping sections of the adjacent sheets of sheet metal are welded together.

10. The method of claim 1, further comprising:

sensing that at least one of the plurality of sheets of sheet metal is not properly aligned with the mandrel using a coil alignment sensor;

the coil alignment sensor being coupled for communication with an actuator of the one of the plurality of coil supports corresponding to the at least one of the plurality of sheets of sheet metal;

adjusting the alignment of the at least one of the plurality of sheets of sheet metal as the plurality of sheets of sheet metal are wound onto the mandrel by activating the actuator; and the actuator being operable to move the one of the plurality of coil supports corresponding to the at least one of the plurality of sheets of sheet metal along a track to which the one of the plurality of coil supports is coupled.

11. The method of claim 1, further comprising compressing the ends of each of the plurality of coils approximately perpendicular to the respective longitudinal axis of each of the plurality of coils to prevent each of the plurality of coils from expanding along the respective longitudinal axis of each of the plurality of coils as the plurality of coils are rotated on the plurality of coil supports.

12. The method of claim 1, further comprising:

unwinding the welded plurality of sheets of sheet metal from the mandrel; and cutting portions from the welded plurality of sheets of sheet metal using a plurality of automated cutting torches as the plurality of sheets of sheet metal are unwound from the mandrel.

13. The method of claim 1, further comprising continuing winding the plurality of sheets of sheet metal onto the mandrel and welding together adjacent sheets of the plurality of sheets of sheet metal until a length of the plurality of sheets of sheet metal wound onto the mandrel is sufficient to form at least two tank car outer jackets.

14. The method of claim 1, further comprising arranging the plurality of coil supports such that adjacent edges of adjacent sheets of the plurality of sheets of sheet metal abut as the plurality of sheets of sheet metal are wound onto the mandrel.

15. A method of fabricating tank car outer jackets, comprising:

coupling a plurality of sheets of sheet metal to an elongate tubular mandrel;

each of the plurality of sheets of sheet metal being adjacent and touching at least one other of the plurality of sheets of sheet metal such that the plurality of sheets of sheet metal form a continuous width of sheet metal;

rotating the mandrel approximately one revolution about a central longitudinal axis of the mandrel;

welding each of the plurality of sheets of sheet metal together with adjacent sheets of the plurality of sheets of sheet metal using a plurality of welding torches; and wherein the rotating and welding occur at the same time such that a welded length of the continuous width of sheet metal corresponding to a circumference of the mandrel results.

16. The method of claim 15, further comprising:

cutting portions from the plurality of sheets of sheet metal using a plurality of cutting torches; and wherein the cutting occurs at the same time as the rotating and welding such that a welded and cut tank car outer jacket results.

17. The method of claim 16, further comprising controlling the rotating, welding, and cutting using a programmable logic controller coupled for communication with the mandrel, the plurality of welding torches, and the plurality of cutting torches.

* * * * *